(12) United States Patent
Kanemitsu (10) Patent No.: US 7,194,526 B2
(45) Date of Patent: Mar. 20, 2007

(54) NETWORK DEVICE MANAGEMENT METHOD, AND NETWORK DEVICES

(75) Inventor: Shigenaka Kanemitsu, Tokyo (JP)

(73) Assignee: Kyocera Corporation, Kyoto (JP)

( * ) Notice: Subject to any disclaimer, the term of this patent is extended or adjusted under 35 U.S.C. 154(b) by 645 days.

(21) Appl. No.: 09/947,276

(22) Filed: Sep. 5, 2001

(65) Prior Publication Data

US 2002/0052938 A1 May 2, 2002

(30) Foreign Application Priority Data

Sep. 22, 2000 (JP) ............................. 2000-288903
Nov. 28, 2000 (JP) ............................. 2000-360958

(51) Int. Cl.
*G06F 15/177* (2006.01)

(52) U.S. Cl. ...................... 709/220; 709/223; 709/224; 709/221

(58) Field of Classification Search ........ 709/217–221, 709/223–224, 203, 208; 370/466; 714/41
See application file for complete search history.

(56) References Cited

U.S. PATENT DOCUMENTS

| | | | |
|---|---|---|---|
| 5,519,878 A * | 5/1996 | Dolin, Jr. .................... 709/220 |
| 5,838,907 A | 11/1998 | Hansen | |
| 6,014,669 A | 1/2000 | Slaughter et al. | |
| 6,085,240 A * | 7/2000 | Suzuki et al. ................ 709/223 |
| 6,286,038 B1 * | 9/2001 | Reichmeyer et al. ....... 709/220 |
| 6,330,597 B2 * | 12/2001 | Collin et al. ................ 709/220 |
| 6,334,178 B1 | 12/2001 | Cannon et al. | |
| 6,357,021 B1 * | 3/2002 | Kitagawa et al. ............. 714/41 |
| 6,430,612 B1 * | 8/2002 | Iizuka ......................... 709/223 |
| 6,477,567 B1 * | 11/2002 | Ohara ......................... 709/223 |
| 6,487,589 B1 * | 11/2002 | Yoshino et al. ............. 709/220 |
| 6,516,347 B1 * | 2/2003 | Nakamura ................... 709/221 |

(Continued)

FOREIGN PATENT DOCUMENTS

EP 0 913 967 10/1998

(Continued)

OTHER PUBLICATIONS

Lea, et al., "Networking Home Entertainment Devices With HAVI", Computer, IEEE Service Center, Los Alamitos, CA, US, vol. 33, No. 9, Sep. 1, 2000, pp. 35-43.

(Continued)

*Primary Examiner*—Saleh Najjar
*Assistant Examiner*—Faruk Hamza
(74) *Attorney, Agent, or Firm*—Hogan & Hartson LLP (57) ABSTRACT

There is provided a technique capable of easily and suitably setting or updating the setting information or the firmware of a plurality of network devices. According to a network device management method, a device information managing section transmits identification information and device information A of a network device, correlates identification information and device information B received from the other network device with the own identification information, generates approximation-level information, and stores this in an identification information database. A command receiving section that has received a setting/updating command C1 stores this setting/updating command in a command database. A setting/updating processing section carries out the setting or updating of the own network device. A command transfer section selectively transfers a setting/updating command to other network devices based on approximation-level information.

7 Claims, 5 Drawing Sheets

U.S. PATENT DOCUMENTS

| | | | |
|---|---|---|---|
| 6,574,662 B2 * | 6/2003 | Sugiyama et al. | 709/223 |
| 6,665,714 B1 * | 12/2003 | Blumenau et al. | 709/222 |
| 6,674,767 B1 * | 1/2004 | Kadyk et al. | 370/466 |
| 6,745,252 B1 * | 6/2004 | Yanagawa et al. | 710/8 |
| 6,826,604 B2 * | 11/2004 | Yamaguchi et al. | 709/220 |
| 6,917,836 B2 * | 7/2005 | Nagasaka et al. | 700/19 |

FOREIGN PATENT DOCUMENTS

| | | |
|---|---|---|
| EP | 1 016 986 | 12/1999 |
| JP | 10-039981 | 2/1998 |
| JP | 11-184810 | 7/1999 |
| WO | 99/35753 | 7/1999 |

OTHER PUBLICATIONS

"The HAVI Specification: Specification of the Home Audio/Video Interoperability (HAVI) Architecture", HAVI Specification, Nov. 19, 1998, pp. 1-384.

Microsoft: "Universal Plug and Play Device Architecture, UPnP, Version 1.0", Microsoft, Jun. 8, 2000.

* cited by examiner

NETWORK DEVICE MANAGEMENT METHOD, AND NETWORK DEVICES

BACKGROUND OF THE INVENTION

1. Field of the Invention

The present invention relates to a technique for managing the setting/updating of a plurality of information devices (network devices) disposed dispersedly on the network, and for managing an easy obtaining of information of the plurality of information devices.

2. Description of the Related Art

In recent years, there have been used network devices having a plurality of information devices connected to each other on the network. Depending on the installation environment, these network devices require various kinds of initial setting. It is also necessary to update the firmware of the installed network devices as well depending on the situation.

The setting information and the setting/updating data for the firmware and the like to be updated are usually constructed in the data file format. These information and data are input to each network device via data communications on the network or via a recording medium such as a PC card.

However, in order to set the information or update the firmware for a large number of information devices that are scattered on the network by utilizing the data communications on the network, it is necessary to repeat the work of transmitting the setting/updating data to each information device by many times.

Moreover, in order to carry out the setting/updating via the recording medium, it is necessary to bring the recording medium to each information device. For example, a person must actually move to each position of each information device to bring the recording medium.

Further, depending on the situation, it is not preferable to uniformly update the firmware of all the information devices on the network. For example, depending on the situation, the setting/updating data does not match a control/setting command system of the information device, and new setting information does not effectively work.

Moreover, depending on the situation, the required level of updating is different for each information device. However, it is generally difficult to judge from the outside the need for updating each information device. Therefore, there is a possibility that the information device that does not require the updating is also updated inappropriately.

Moreover, some network devices such as network printers have a server function using the HTTP (hypertext transfer protocol) for the purpose of obtaining device information such as status information and function information of the network device. Such network devices can provide device information in the format of a Web (WWW: worldwide web) page described in the HTML (hypertext markup language). With this arrangement, users can obtain device information of the network devices via a communication network.

For reading a Web page, a browser as exclusive software for reading is necessary. At present, a browser is general software, and various kinds of browsers can be easily obtained at cost or free of charge.

Moreover, for reading a Web page, it is necessary to assign information that identifies a network device for the reading according to the URL (uniform resource locator) standard. Hereinafter, the assigned identification information will be referred to as the URL.

This URL includes various kinds of description methods depending on the network environments used. For example, in the network based on the TCP/IP (transmission control protocol/internet protocol), it is possible to use an IP address as the URL.

However, in the case of reading Web pages of a plurality of network devices by sequentially switching the Web pages, it has been necessary that a user assigns the URL for each device in the browser at a host computer. Therefore, it has been difficult to obtain information of a plurality of network devices in an easy operation.

Some browsers have a function of storing the URL that the user requires. However, in order to store the URL of each network device, it has usually been necessary that the user once inputs the URL, and then connects to each network device. When the number of network devices becomes enormously large, enormously large labor is necessary for manually inputting the URL of each network device.

Further, the URL stored in the host computer is effective only when this host computer is connected to each network device. Therefore, it is difficult for a certain host computer to connect to a network device by utilizing the URL stored in other host computer.

SUMMARY OF THE INVENTION

It is a first object of the present invention to provide a technique capable of easily and suitably setting or updating the setting information or the firmware of a plurality of network devices, by solving the above problems.

It is a second object of the present invention to provide a technique capable of obtaining information of a plurality of network devices in a simple operation.

In order to achieve the first object, according to one aspect of the present invention, there is provided a network device management method for setting or updating the setting information or the firmware of a plurality of information devices installed on a network, the method comprising: the processing that each information device transmits to the other information devices on the network, identification information of the own information device and device information of a structure and functions and the like that reflect characteristics of a control/setting command of the own information device; the processing that the information device that has received identification information and device information from the other information device correlates the received device information with the own device information, generates approximation-level information that shows a level that the control/setting command of the other information device and the own control/setting command are in common, and stores the approximation-level information together with the identification information of the other information device; the processing that the information device that has received a setting/updating command including any one of the setting/updating data for setting or updating the setting information or the firmware and position information of the setting/updating data stores this setting/updating command, and sets or updates the own setting information or the firmware based on the setting/updating command; and the processing that the information device selectively transfers to the other information devices the stored setting/updating command based on the approximation-level information.

According to another aspect of the present invention, an information device generates approximation-level information from device information received from other information device, and transfers a setting/updating command to the other information devices based on this approximation-level information. With the above arrangement, in setting or updating a plurality of information devices, the setting or updating of at least one information device makes it possible to automatically set/update other information devices that require a similar setting/updating operation.

Further, as the setting/updating command is transferred based on the approximation-level information, it is possible to transmit the setting/updating data that matches a control/setting command system to each information device without omission. When the approximation levels are close to each other, there is a tendency that the necessity of the updating is also similar. Therefore, when the setting/updating data is transmitted to one information device that requires the updating, it is possible to carry out a suitable setting/updating to other information devices that require a similar updating.

Moreover, as the device information is exchanged between the network devices, a user does not need to understand the identification information of all the information devices that require the updating work. Further, the user does not need to manage the identification information.

As described above, according to another aspect of the present invention, it is possible to easily and suitably set or update the setting information or the firmware of a plurality of network devices.

Moreover, according to still another aspect of the present invention, there is provided a network device management method, wherein at the time of generating the approximation-level information, a plurality of items of the device information are weighted. Based on this weighting, it is possible to easily generate approximation-level information suitable for each information device, by placing a priority to an optional item of the device information.

Moreover, according to still another aspect of the present invention, there is provided a network device management method, wherein the information device that has received the setting/updating command selectively stores the setting/updating command based on the approximation-level information of the information device that has transmitted the setting/updating command, and sets or updates the own setting information or the firmware based on this setting/updating command. When the information device decides on the setting or updating according to the setting/updating command based on the approximation-level information of the information device that has transmitted the setting/updating command, as described above, it becomes possible to more securely match the setting/updating data with the control/setting command system of the information device. As a result, it becomes possible to effectively operate the new setting information more securely.

Moreover, according to still another aspect of the present invention, there is provided a network device management method, wherein an identifier is added to the setting/updating command, and the information device that has received the setting/updating command stores the identifier and the setting/updating command when an identifier that is the same as this identifier has not been stored, and sets or updates the own setting information or the firmware according to this setting/updating command. As described above, when the identifier of the setting/updating command is checked, it is possible to prevent a duplicated setting or updating based on the setting/updating command that has been transferred in duplicate.

Moreover, according to still another aspect of the present invention, there is provided a network device as an information device installed on a network, the network device comprising: a device information managing section that transmits to the other information devices on the network, identification information of the own information device and device information of a structure and functions and the like that reflect characteristics of a control/setting command of the own information device, receives identification information and device information from the other information device, correlates the received device information with the own device information, and generates approximation-level information that shows a level that the control/setting command of the other information device and the own control/setting command are in common; an identification information database that stores the approximation-level information together with the identification information of the other information device; a command receiving section that receives a setting/updating command including any one of the setting/updating data for setting or updating the setting information or the firmware and position information of the setting/updating data; a command database that stores this setting/updating command; a setting/updating processing section that sets or updates the own setting information or the firmware based on the setting/updating command; and a command transfer section that selectively transfers to the other information devices the stored setting/updating command based on the approximation-level information.

According to still another aspect of the present invention, it is possible to easily and suitably set or update the setting information or the firmware of a plurality of network device, like the network device management method of the above aspect.

In order to achieve the second object, according to still another aspect of the present invention, there is provided a network device management method, wherein when each of a plurality of information devices to be managed and having a server function on a network displays device information via the network, each information device displays the device information in a hypertext format linked to other information devices connected to the network.

As described above, when the network devices are linked on the network, it becomes possible to read device information by switching from device information of one network device to device information of other network devices. In other words, when the device information is switched from the device information of one network device to the device information of other network devices, it is not necessary to input identification information such as the URL of other network devices. Therefore, it is possible to obtain the information of a plurality of network devices in a simple operation.

Moreover, as the network devices are linked on the network, when a user knows the identification information such as the URL of one network device in advance, the user can automatically obtain the link to other network devices. Therefore, the user does not need to manually input the identification information such as the URL of the other network devices.

Moreover, even when a host computer for reading the device information has been changed, the user can easily read the device information of other network device when the user knows the identification information such as the URL of one network device in advance.

Moreover, according to still another aspect of the present invention, there is provided a network device management method, wherein when each information device is started or when each information device is connected to the network, this information device simultaneously reports to other information devices on the network identification information for making access to the device information of this information device from the network, and each information device that has received the identification information stores this identification information, and displays an anchor corresponding to this identification information together with the device information of the information device.

As described above, since each network device provides identification information as link information to other network devices, a manager does not need to update the identification information list.

Since the anchor corresponding to the identification information is displayed together with the device information, the user can easily read the display of a desired network device that has been linked, by assigning the anchor corresponding to the desired network device.

Moreover, as the user does not require individual searching for each network device from the host computer that reads the device information, it is possible to reduce the traffic to the network.

DETAILED DESCRIPTION OF THE PREFERRED EMBODIMENTS

Preferred embodiments of the present invention will be explained below with reference to the drawings. It should be noted that the present invention is not limited to these embodiments.

(First Embodiment)

Figure 1:
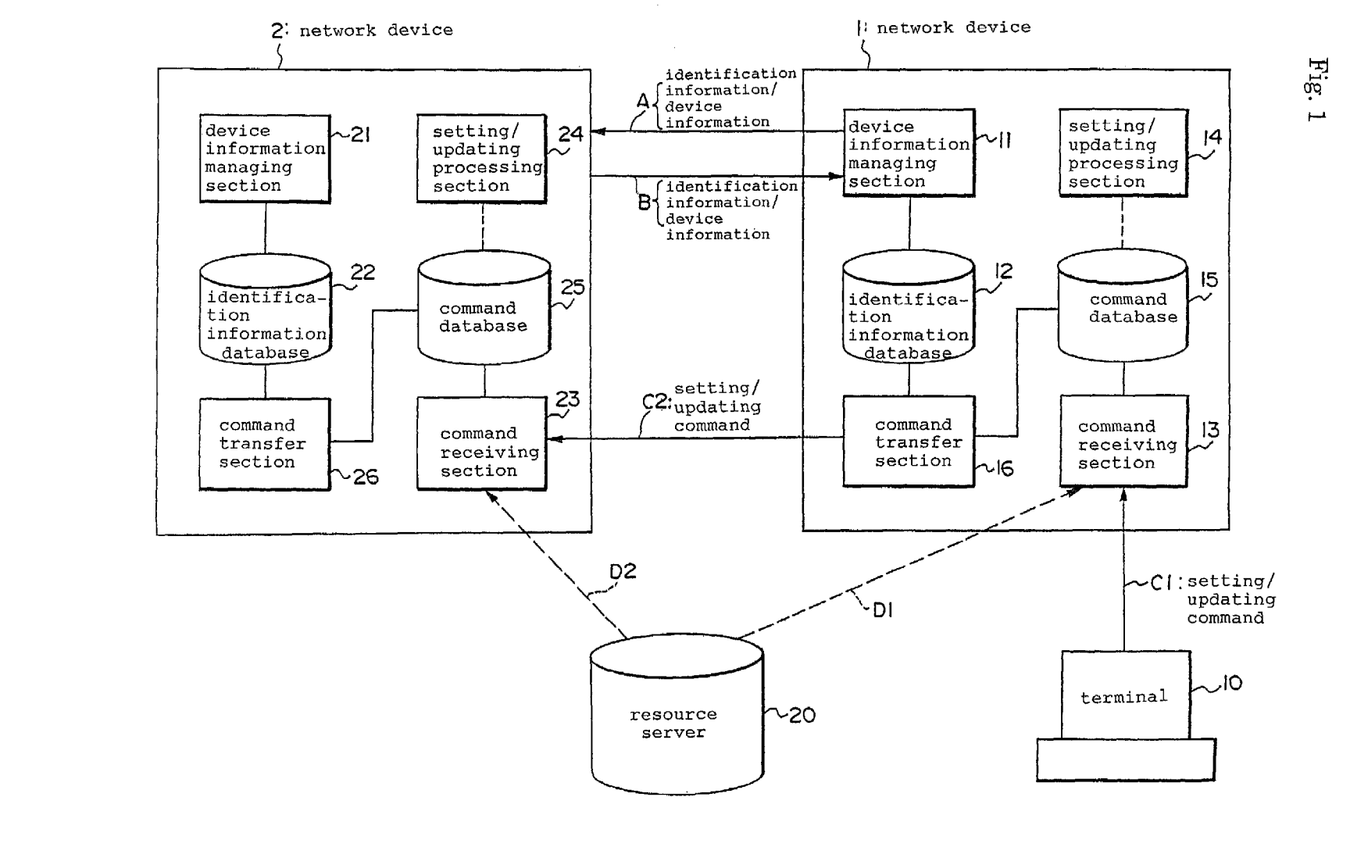
FIG. 1 is a diagram for explaining a network device management method according to a first embodiment of the present invention.

A structure of a network device such as a network printer according to a first embodiment of the invention will be explained with reference to FIG. 1. FIG. 1 shows two network devices 1 and 2 on a network as an example.

As shown in FIG. 1, the network devices 1 and 2 consist of device information managing sections 11 and 21, identification information databases 12 and 22, command receiving sections 13 and 23, setting/updating processing sections 14 and 24, command databases 15 and 25, and command transfer sections 16 and 26, respectively.

As both network devices 1 and 2 have the same constituent elements, the structure of the network device 1 will be explained below as a representative structure.

The device information managing section 11 transmits identification information and device information A of the network device 1 to the other network device 2 and the like on the network. The device information is the information on the structure and functions and the like that reflect the characteristics of a control/setting command. For example, the device information is the information relating to a model of the network device, and a structure of an auxiliary device such as a paper feeder, and capacity such as the processing speed.

The information on the structure of the auxiliary device and the like reflects characteristics of the control/setting command. In other words, when the network devices have similar structures of the auxiliary devices and the like, there is generally a high possibility that the same control/setting command can be used effectively to these network devices.

The identification information and the device information A can be automatically transmitted at the time of starting the network device or at the time of connecting the network device to the network. Alternatively, these can be automatically transmitted a preset updating time. Based on the transmission of the identification information and the device information A, the participation of the network device 1 in the network is posted.

The function of transmitting the identification information and the device information A can be stopped or restarted at the request of a network manager or a user concerned. Further, based on an instruction from the manager or the user concerned, the identification information and the device information A can be transmitted, regardless of whether the function is being stopped or in work.

When the device information managing section 11 has received identification information and device information B from the other network device like the network device 2 and the like, the device information managing section 11 correlates the received device information with the own device information. Then, the device information managing section 11 generates approximation-level information that shows, for example, a level that the control/setting command of the network device 2 and the own (the network device 1) control/setting command are in common. When the functions and formats between the network devices are similar in this approximation-level information, for example, the approximation levels of the setting/updating commands are also high.

The device information usually includes a plurality of elements. For example, the device information includes two elements of a device structure and a model. In the case where the two network devices have the same device structures and the model of the other network device 2 is much older than the model of the own network device 1, and the case where the models of the two network devices are substantially the same and the device structures are quite different, there is room to select which approximation level is to be set higher.

Therefore, in the present embodiment, a plurality of items of the device information are weighted at the time of generating the approximation-level information. Based on the setting of the weights, it becomes possible to easily generate the approximation-level information suitable for each information device, by placing priority to an optional item in the device information.

The approximation-level information of the network device 2 generated by the device information managing section 11 is stored in the identification information database 12 together with the identification information of the network device 2. For example, in the TCP/IP standard, the identification information is expressed in the IP address, and the approximation-level information is expressed as a numerical value that shows an approximation level for each identification information.

It is not always necessary to store all the approximation-level information generated. For example, a limit may be set to the range of the address of the network device of which approximation-level information is to be stored, and an upper limit and the like may be set to the number of registration in the identification information database 12.

With this arrangement, only the approximation-level information that satisfies the setting condition may be stored.

Moreover, the storing of the approximation-level information of a specific network device may be prohibited (mask processing).

In order to exchange the identification information and the device information between the network devices, it is necessary that the network devices are logically connected to each other via the network. In other words, it is necessary that the network devices are always in a position to be able to communicate. For this purpose, the device information managing section 11 may verify the logical connection, and report a result of the verification to the manager.

For verifying the logical connection, it is preferable, for example, to carry out a device checking by using the SNMP (simple network management protocol) or the like, in addition to an address checking based on the operation of the PING or the like in the TCP/IP protocol.

When a setting/updating command C1 has been transmitted to the network device 1 from a terminal 10 connected to the network or from other network device, the command receiving section 13 receives this setting/updating command C1. This setting/updating command C1 can be handled as a file.

The setting/updating command C1 may directly include setting/updating data for setting or updating the setting information or the firmware, or may indirectly include the setting/updating data as its position information. For example, in the network based on the TCP/IP (transmission control protocol/internet protocol), position information for assigning a data position within a resource server 20 in which the setting/updating data is being stored, may be described according to the URL (universal resource locator) standard.

The setting/updating command C1 is received by the command receiving section 13 not only when the setting/updating command has been transmitted via the network, but also when the setting/updating command has been loaded on the network device 1 as a recording medium such as a PC card.

The setting/updating command C1 received by the command receiving section 13 is stored in the command database 15.

However, in the present embodiment, an identifier is attached to the header of the setting/updating command C1. The network device 1 that has received this setting/updating command stores the setting/updating command C1 together with the identifier of the header, only when an identifier that is the same as the identifier of the header is not being stored.

When the identifier of the setting/updating command is checked, it is possible to prevent a duplicated setting or updating based on the setting/updating command that has been transmitted in duplicate.

The contents of each setting/updating command registered in the command database 15 may be displayed on a display unit (not shown). Further, each setting/updating command registered in the command database 15 may be automatically deleted based on a condition like a lapse time or a total data size, for example, set in advance by the manager or the user concerned.

Further, according to the present embodiment, the command receiving section 13 reads the approximation-level information of the information device that has transmitted the setting/updating command, from the identification information database 12. Based on this approximation-level information, the command receiving section 13 determines the storing of the setting/updating command information. In other words, only when this setting/updating command has been transmitted from the network device of which approximation-level information is higher than a certain standard, the command receiving section 13 selectively stores the setting/updating command.

Next, the setting/updating processing section 14 sets or updates the own setting information or firmware, according to the setting/updating command stored in the command database 15.

Specifically, when the setting/updating command directly includes the setting/updating data, the setting/updating processing section 14 carries out the setting or updating by using this setting/updating data. When the setting/updating command indirectly includes the setting/updating data as its position information, the setting/updating processing section 14 reads the setting/updating data from the position indicated by this position information, and carries out the setting or updating. For example, the setting/updating processing section 14 reads setting/updating data D1 from the resource server 20 according to the position information.

After finishing the setting/updating processing, a result of the setting/updating may be posted by e-mail or the like to a receiver set in advance by the network manager or the user concerned.

Next, the command transfer section 16 selectively transfers the setting/updating command stored in the command database 15 to the other information devices, based on the approximation-level information stored in the identification information database 12.

In other words, the command transfer section 16 selectively transmits a setting/updating command C2 to a network device like the network device 2 of which approximation level indicated by the approximation-level information is at a certain level or above.

With the above arrangement, in the case of setting or updating a plurality of information devices, the setting or updating of at least one information device in advance makes it possible to automatically set or update other information devices that require a similar setting/updating work.

As the setting/updating command is transferred based on the approximation-level information, it is possible to transmit to each information device the setting/updating data that matches the control/setting command system of the information device without leakage. When the approximation levels are close to each other, there is a tendency that the needs for the updating is also similar. Therefore, the transmission of the setting/updating data to one information device that requires the updating makes it possible to suitably set or update other information devices that require the similar updating.

The transfer of the setting/updating command may be automatically started according to an optional suitable condition like after the setting/updating processing section 14 has finished setting or updating processing. Alternatively, the transfer of the setting/updating command may be automatically started triggered by a detection of a time event set as an assigned time or a participation of a new device in the network.

The function of the command transfer section 16 can also be stopped. When the command transfer section 16 has not transferred the setting/updating command C2, the network device 1 is positioned as an end terminal of the transmission of the setting/updating command. When a specific network device is set as an end terminal, it becomes possible to shorten a continued time of a congestion status of the network due to the transfer of the setting/updating commands.

Further, it may be arranged such that a plurality of devices are set as end terminals, and only one network device that is used by the manager for updating the setting information is set as "non-end terminal" on a local network. In this case, even when the manager carries out a setting work to the "non-end terminal" network device, it is not possible to retransmit the setting/updating command from the "end terminal" network devices of which approximation-level information has been registered, to the "non-end terminal" network device. Therefore, it is possible to restrict the transfer from the territory of these network devices.

Next, an example of the operation of the network device 1 according to the present invention will be explained with reference to flowcharts shown in FIG. 2 and FIG. 3.

Figure 2:
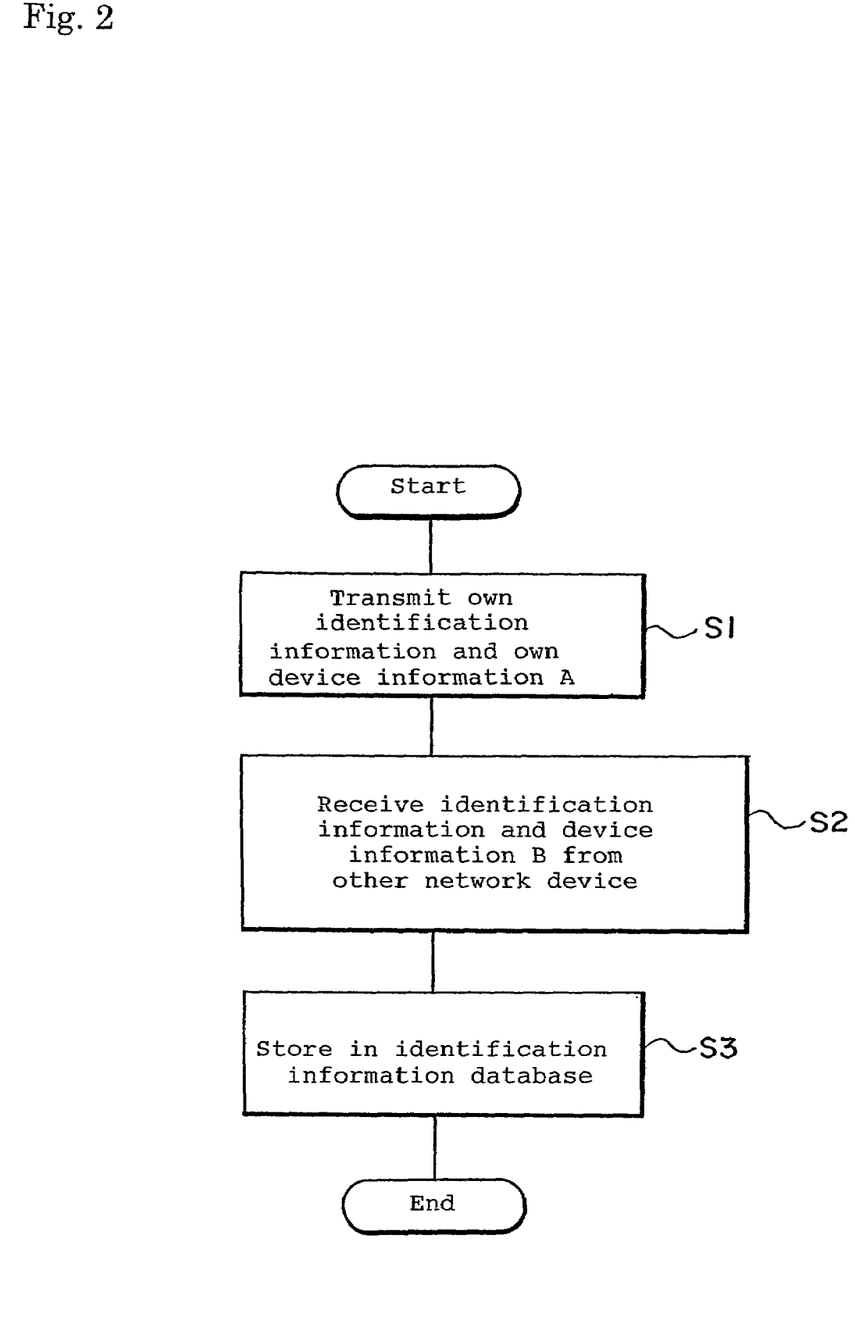
FIG. 2 is a flowchart for explaining an example of the operation of a network device in the first embodiment of the present invention.

First, the network device 1 transmits the own identification information and the own device information A to the network device 2 (step S1 in FIG. 2).

When the network device 1 has received the identification information and the device information B from the network device 2 (step S2 in FIG. 2), the network device 1 correlates the received device information with the own device information. Then, the network device 1 generates approximation-level information that shows a level that the control/setting command of the network device 2 and the control/setting command of the own device (the network device 1) are in common. Further, the network device 1 stores the generated approximation-level information in the identification information database 12 together with the identification information of the network device 2 (step S3 in FIG. 2).

The order of step S1, step S2 and step S3 is not limited to the above. It is also possible to set such that the reception of a setting/updating command transmitted from a specific information device is fixedly rejected.

Figure 3:
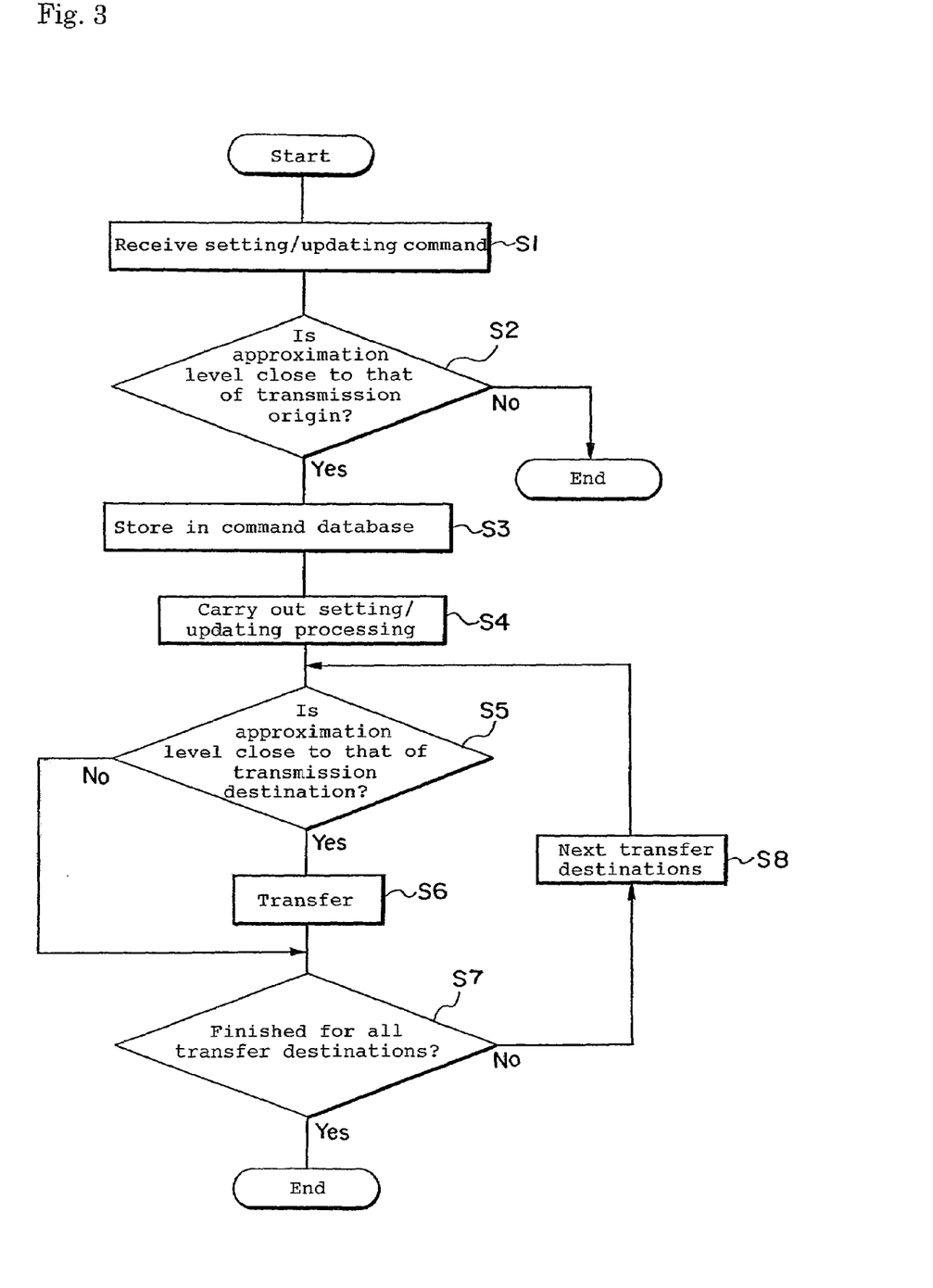
FIG. 3 is a flowchart for explaining an example of the operation of a network device that has received a setting/updating command.

When the terminal 10, for example, transmits the setting/updating command C1 to the network device 1, the command receiving section 13 of the network device 1 receives the setting/updating command C1 (step S1 in FIG. 3).

Next, the command receiving section 13 confirms the approximation-level information of the information device that has transmitted the setting/updating command C1 and the network device 1 (step S2 in FIG. 3).

When the approximation-level information are close to each other, the command receiving section 13 selectively stores the setting/updating command C1 in the command database 15 (step S3 in FIG. 3).

When there is no approximation-level information of the transmission origin like when the transmission origin is the terminal 10, the process may proceed to the next step by assuming that there is a high approximation level.

Further, it may be arranged such that an identifier like a check-sum is attached to the header of the setting/updating command C1. Then, it is confirmed at a stage before confirming the approximation-level information, whether the identifier that is the same as this identifier is stored in the command database 15 or not. Only when the same identifier is not stored, the approximation-level information may be selectively confirmed. Specifically, for example, the network device 1 calculates the check-sum of the header of the received setting/updating command C1 based on a constant procedure, and confirms whether the data has already been applied or not. When only the check-sum of the header is utilized as the identifier as explained above, it is possible to easily calculate the check-sum even when the data size of the setting/updating command is large.

Then, the setting/updating processing section 14 sets or updates the own setting information or the firmware, according to the stored setting/updating command (step S4 in FIG. 3).

Next, the command transfer section 16 confirms the approximation level of each network device registered in the identification information database (step S5 in FIG. 3).

Then, the command transfer section 16 selectively transfers the setting/updating command stored in the command database to only the network device 2 of which approximation level is close to that stored in the identification information database 12 (step S6 in FIG. 3).

Figure 4:
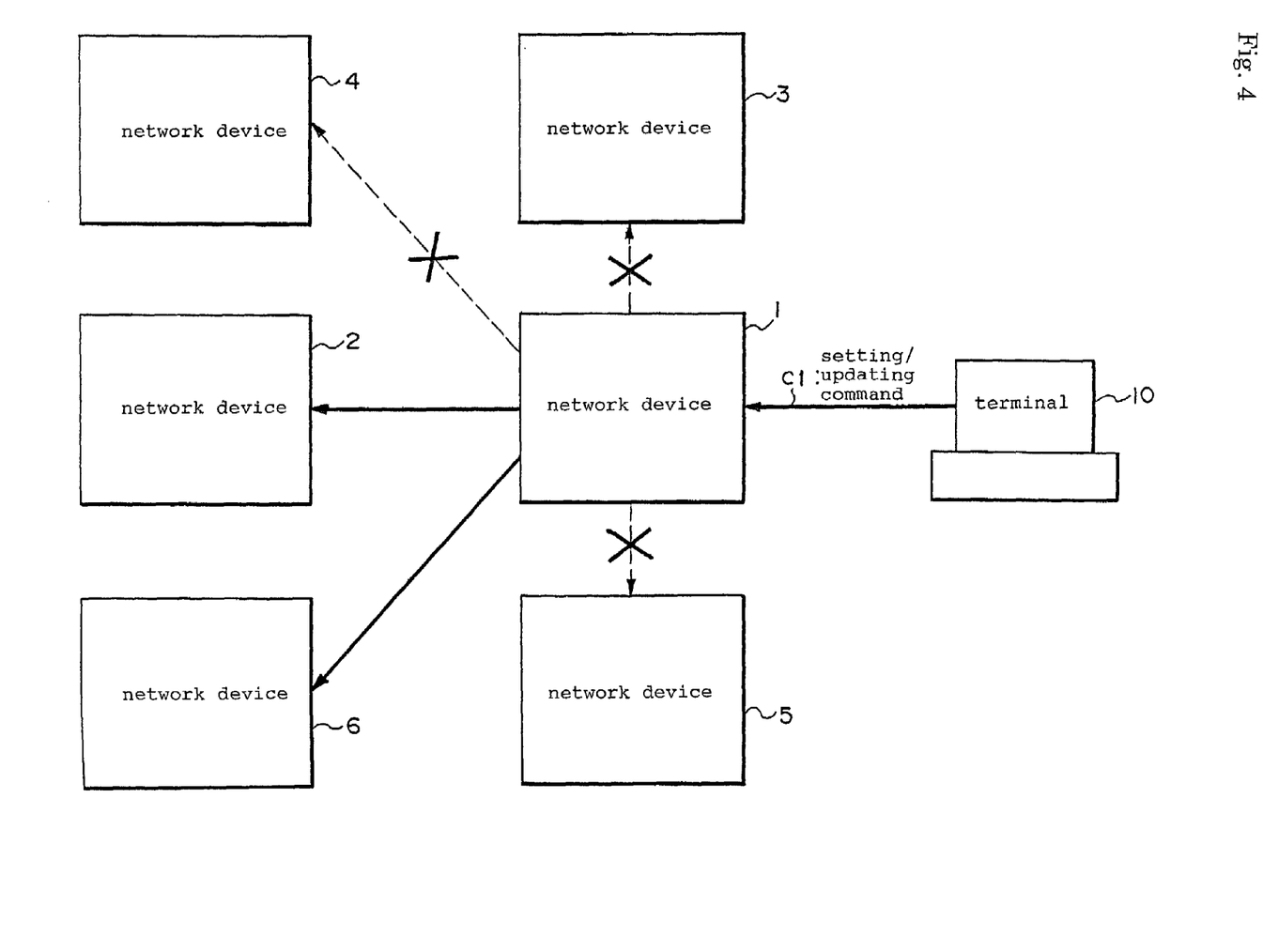
FIG. 4 is a block diagram for explaining a selective transfer of a setting/updating command.

FIG. 4 shows a status of transferring of a setting/updating command.

According to an example shown in FIG. 4, a network device 1 selectively transfers a setting/updating command C1 input from a terminal 10, to only a network devices 2 and 6 of which approximation levels of the approximation-level information are high among network devices 2 to 6. The network device 1 does not transfer the setting/updating command to the network devices 3, 4 and 5 of which approximation levels of the approximation-level information are low.

As described above, as the setting/updating command is transferred based on the approximation-level information, it is possible to transmit to each information device the setting/updating data that matches the control/setting command system of the information device without leakage. When the approximation-level information are close to each other, there is a tendency that the needs for the updating is also similar. Therefore, the transmission of the setting/updating data to one information device that requires the updating makes it possible to suitably set or update other information devices that require the similar updating.

(Second Embodiment)

Figure 5:
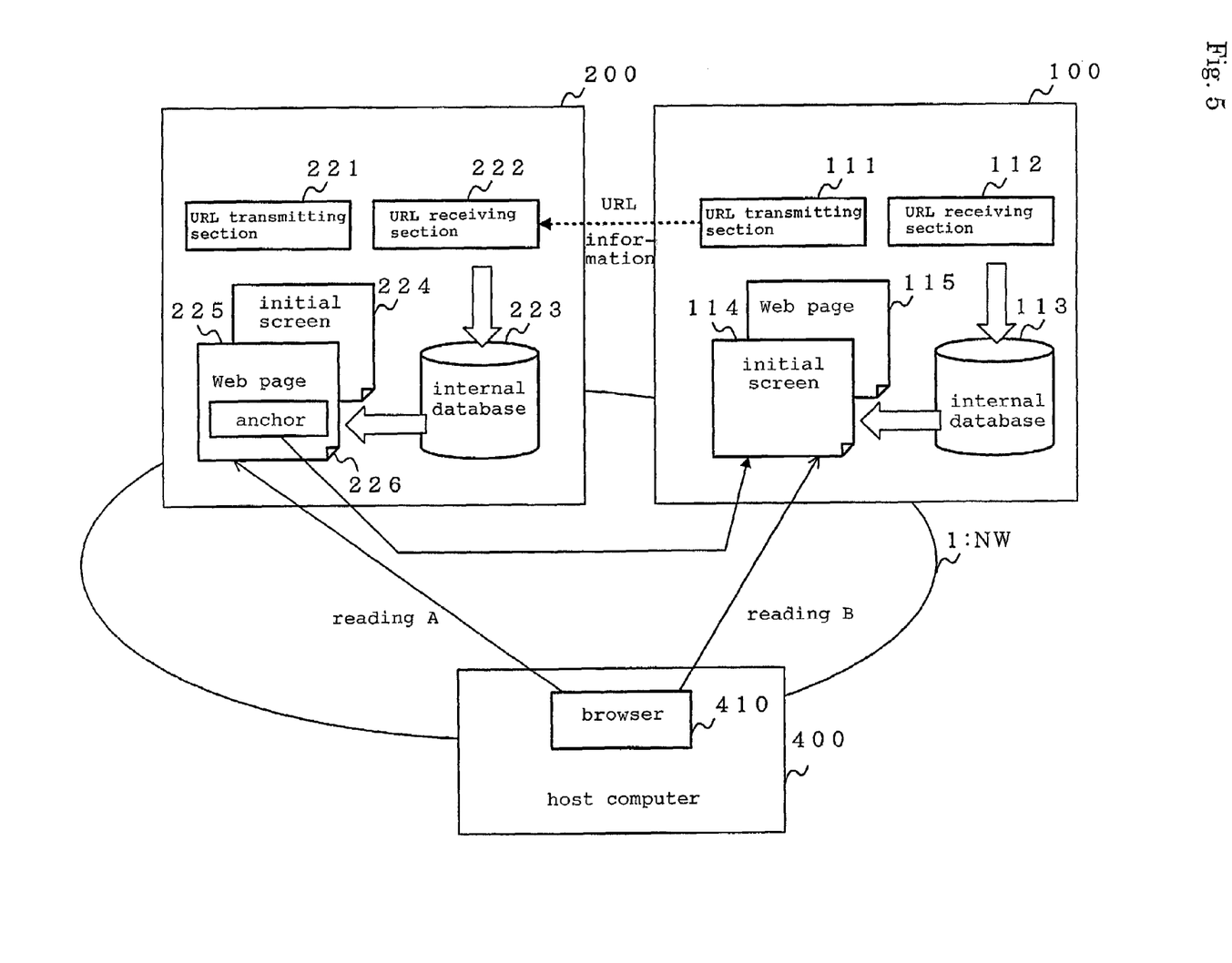
FIG. 5 is a diagram for explaining a network device management method according to a second embodiment of the present invention.

Next, a second embodiment of the present invention will be explained with reference to FIG. 5.

In the second embodiment, there will be explained a case of managing network devices 100 and 200 as two information devices that have the HTTP server function on a communication network NW. These network devices 100 and 200 display respective device information via the network NW.

The network device in this case refers to a network printer or a scanner, for example. The device information refers to status information or function information, for example.

The device information of the network devices 100 and 200 connected to the network NW are displayed in the hypertext format as Web pages described in the mutually linked HTML. A user reads the Web pages by using a browser at a host computer 400.

In order to establish a link of the device information, each of the network devices 100 and 200 posts to each other about the participation in a network 1, at the time when the network device is started or when the network device is connected to the network 1. A case that the network device 100 posts a message about its participation in the network 1 will be explained below.

At the time of starting or at the time of connecting to the network, the network device 100 simultaneously posts the URL of the network device 100 to other network devices on the network NW. This URL consists of the own address and other information. This URL is the identification information for enabling other network devices to make access to the device information of this network device on the network.

The network device 200 that has received the simultaneously reported URL stores the received URL in its internal database 223. Then, the network device 200 displays an anchor 226 corresponding to this URL on a Web page 225 together with the device information. As the anchor 226, there may be displayed the URL itself or a tag such as a device name corresponding to the URL.

The function of this simultaneous reporting may be stopped or re-started based on a request from the network manager or the user. While the function of this simultaneous reporting is being stopped, the network manager or the user may update the URL stored in the internal databases 113 and 223 of the network devices 100 and 200 respectively.

It is also possible to move the contents of the internal database 223 of the network device 200 to the internal database 113 of the network device 100. Further, this move may be automatically executed triggered by a detection of a time event set as an assigned time or a participation of a new device in the network.

When the user is reading the Web page 225 of the network device 200 by using the browser 410 at the home computer 400 (reading A), the user clicks the anchor 226 on the Web page 225 with a pointer on the display screen. Then, the screen is easily switched to an initial screen 114 of the network device 100 linked with this anchor 226 (reading B). The Web page 115 of the network device 100 is displayed on the screen. As a result, the user can easily obtain the device information of the second network device 3.

While the above first and second embodiments explain examples of the constructions of the present invention under a specific condition, it is also possible to modify the present invention in various manners. For example, while the description has been made of the case where two information devices are managed on the network in the above embodiments, the number of the information devices to be managed is not limited to two in the present invention.

As described above, it is possible to suitably apply the present invention to a technique for integrally managing the setting/updating of a plurality of information devices (network devices) that are scattered on the network like the Internet or the LAN (local area network). Further, it is possible to suitably apply the present invention to a technique for enabling a user to easily obtain information of other network devices scattered on the network, at one network device.

The invention is based on Japanese Patent Applications No. 2000-288903 and No. 2000-360958, which are hereby incorporated by reference.

It is to be understood by those skilled in the art that the forgoing description relates to preferred embodiments of the invention and that various changes and modifications may be made in the invention without departing from the spirit and scope thereof. Also it is to be understood that the invention is not limited to the embodiments thereof except as defined in the appended claims.

What is claimed is:

1. A network device management method for setting or updating setting information or firmware of a plurality of peripheral information devices having a printing or scanning function installed on a network, the method comprising:

processing that any of the plurality of peripheral information devices transmits to other peripheral information devices on the network, identification information and device information that reflect one or more characteristics of a control/setting command of the transmitting information device;

processing that any of the plurality of peripheral information devices that has received the identification information and device information from the transmitting peripheral information device correlates the received device information with the device information of the receiving peripheral information device, generates an approximation-level information that shows a level that the control/setting command of the transmitting and receiving peripheral information devices are in common, and stores the approximation-level information together with the received identification information of the transmitting peripheral information device;

processing that any of the peripheral information devices that has received a setting/updating command including any one of a setting/updating data for setting or updating a setting information or a firmware and position information of the setting/updating data stores the setting/updating command, and sets or updates the setting information or the firmware of the command receiving peripheral information device based on the setting/updating command; and processing that any of the peripheral information devices that has received a setting/updating command selectively transfers to other peripheral information devices the stored setting/updating command based on the approximation-level information.

2. The network device management method according to claim 1, wherein
at the time of generating the approximation-level information, a plurality of items of the device information are weighted.

3. The network device management method according to claim 1, wherein
the peripheral information device that has received the setting/updating command selectively stores the setting/updating command based on the approximation-level information of the peripheral information device that has transmitted the setting/updating command, and sets or updates the setting information or the firmware of the receiving peripheral information device based on the setting/updating command.

4. The network device management method according to claim 1, wherein
an identifier is added to the setting/updating command, and
the peripheral information device that has received the setting/updating command stores the identifier and the setting/updating command when an identifier that is the same as this identifier has not been stored, and sets or updates the setting information or the firmware of the receiving peripheral information device according to the setting/updating command.

5. A network device as a peripheral information device having a printing or scanning function installed on a network, the network device comprising:
a device information managing section that transmits to other peripheral information devices on the network, identification information and device information that reflect one or more characteristics of a control/setting command of the peripheral information device, receives identification information and device information from the other peripheral information device, correlates the received device information with the device information of the peripheral information device, and generates approximation-level information that shows a level that the control/setting command of the other peripheral information device and the control/setting command of the peripheral information device are in common;

an identification information database that stores the approximation-level information together with the identification information of the other peripheral information device;

a command receiving section that receives a setting/updating command including any one of a setting/updating data for setting or updating a setting information or a firmware and position information of the setting/updating data;

a command database that stores the setting/updating command;

a setting/updating processing section that sets or updates the setting information or the firmware of the peripheral information device based on the setting/updating command; and a command transfer section that selectively transfers to other peripheral information devices the stored setting/updating command based on the approximation-level information.

6. The network device management method according to claim 5, wherein when each of a plurality of peripheral information devices to be managed and having a server function on a network displays device information via the network, each peripheral information device displays the device information in a hypertext format linked to other peripheral information devices connected to the network, wherein when each peripheral information device is started or when each peripheral information device is connected to the network, the peripheral information device simultaneously reports to other peripheral information devices on the network identification information for making access to the device information of this peripheral information device from the network, and each peripheral information device that has received the identification information stores this identification information, and displays an anchor corresponding to this identification information together with the device information of the peripheral information device.

7. The network device management method according to claim 6, wherein

HTTP (hypertext transfer protocol) is used for the server function, the device in-formation is displayed in a format of a Web (WWW: world wide web) page described in an HTML (hypertext markup language), and the identification information is described in a URL (uniform resource locator) standard.

* * * * *